United States Patent
Su et al.

(10) Patent No.: US 10,657,295 B2
(45) Date of Patent: May 19, 2020

(54) HARDWARE ENCRYPTION HOUSING AND PAYMENT DEVICE

(71) Applicant: PAX COMPUTER TECHNOLOGY (SHENZHEN) CO., LTD., Shenzhen, Guangdong (CN)

(72) Inventors: Xiaoyan Su, Guangdong (CN); Yuzhuo Wang, Guangdong (CN); Liheng Deng, Guangdong (CN)

(73) Assignee: PAX COMPUTER TECHNOLOGY (SHENZHEN) CO., LTD., Shenzhen, Guangdon (CN)

( * ) Notice: Subject to any disclaimer, the term of this patent is extended or adjusted under 35 U.S.C. 154(b) by 108 days.

(21) Appl. No.: 15/745,069

(22) PCT Filed: Jul. 31, 2017

(86) PCT No.: PCT/CN2017/095271
§ 371 (c)(1),
(2) Date: Jan. 15, 2018

(87) PCT Pub. No.: WO2018/153023
PCT Pub. Date: Aug. 30, 2018

(65) Prior Publication Data
US 2019/0012491 A1    Jan. 10, 2019

(30) Foreign Application Priority Data
Feb. 22, 2017  (CN) .................... 2017 2 0164744 U

(51) Int. Cl.
G06F 21/00    (2013.01)
G06F 21/86    (2013.01)
(Continued)

(52) U.S. Cl.
CPC ............ G06F 21/86 (2013.01); G06F 1/1601 (2013.01); G06F 1/185 (2013.01); G06F 21/60 (2013.01);
(Continued)

(58) Field of Classification Search
CPC ........ G06F 21/86; G06F 21/60; G06F 1/1601; G06F 1/185; G06F 2221/2143;
(Continued)

(56) References Cited

U.S. PATENT DOCUMENTS 9,578,763 B1 *   2/2017   Wade .................... H05K 5/0208
10,504,096 B1 *  12/2019  Hafemann ........... G06Q 20/206
(Continued)

FOREIGN PATENT DOCUMENTS

CN    201716792    1/2011
CN    102103775    6/2011
(Continued)

OTHER PUBLICATIONS

EPO machine translation of description portion of CN102968854 (published Mar. 13, 2013) cited on Jan. 15, 2018 IDS.*
(Continued)

*Primary Examiner* — Jeffrey C Pwu
*Assistant Examiner* — William A Corum, Jr.
(74) *Attorney, Agent, or Firm* — Rankin, Hill & Clark LLP

(57) ABSTRACT

A hardware encryption housing and a payment device using the hardware encryption housing includes a top shell, a bottom shell, a circuit board and a trigger switch configured to transmit a trigger signal when the top shell is separated from the bottom shell. A security chip, mounted on the circuit board, has a storage module configured to store key information and a detection module configured to clear the key information and lock the security chip after the trigger
(Continued)

signal is detected. The trigger signal is transmitted when the top shell is separated from the bottom shell, and the detection module is provided in the security chip to detect whether the trigger switch transmits a trigger signal. When detected, the key information in the storage module is cleared and the security chip is locked.

14 Claims, 6 Drawing Sheets

(51) Int. Cl.
    *G06F 1/18*        (2006.01)
    *G06F 1/16*        (2006.01)
    *G06Q 20/38*      (2012.01)
    *G06F 21/60*      (2013.01)
    *G07G 1/12*       (2006.01)
    *G07F 7/08*       (2006.01)
    *G07F 7/10*       (2006.01)

(52) U.S. Cl.
    CPC ............ *G06Q 20/38* (2013.01); *G06Q 20/382* (2013.01); *G06Q 20/3823* (2013.01); *G07F 7/088* (2013.01); *G07F 7/1008* (2013.01); *G07G 1/12* (2013.01); *G06F 2221/2143* (2013.01); *G06Q 2220/00* (2013.01)

(58) Field of Classification Search
    CPC ............. G06Q 20/382; G06Q 2220/00; G06Q 20/3823; G06Q 20/38; G07F 7/1008; G07F 7/088; G07G 1/12
    See application file for complete search history.

(56) References Cited

U.S. PATENT DOCUMENTS

| | | | |
|---|---|---|---|
| 2014/0036181 A1* | 2/2014 | Kamon | H05K 1/118 349/33 |
| 2015/0301919 A1* | 10/2015 | Huang | G01R 31/31719 713/340 |
| 2018/0031885 A1* | 2/2018 | Nakamori | G01L 1/146 |
| 2018/0231842 A1* | 8/2018 | Xia | G02B 6/0065 |

FOREIGN PATENT DOCUMENTS

| | | |
|---|---|---|
| CN | 102968854 | 3/2013 |
| CN | 202838534 | 3/2013 |
| CN | 105279461 | 1/2016 |
| CN | 106023486 | 10/2016 |
| WO | 2016086972 | 6/2016 |

OTHER PUBLICATIONS

Written Opinion and International Search Report for International application No. PCT/CN2017/095271 dated Nov. 28, 2017, 13 pages.

* cited by examiner

HARDWARE ENCRYPTION HOUSING AND PAYMENT DEVICE

TECHNICAL FIELD

The present application pertains to the field of payment devices, and in particular relates to a hardware encryption housing and a payment device using the hardware encryption housing.

BACKGROUND

As the technology develops, it is more and more convenient for transaction payment and there are also more payment methods, such as near field payment and code scanning payment. When making transaction payments, it is especially important for payment devices to protect the information of users because of the direct involvement of user account information. Current payment devices generally use software programs to encrypt transaction data for information protection. However, some criminals may disassemble the housing to steal user account information directly from the payment module or circuit board in the housing.

SUMMARY

The purpose of the present application is to provide a hardware encryption housing, which aims at solving the problem that criminals will disassemble the housing of the current payment devices to steal user account information.

The present application is realized as follows. A hardware encryption housing comprises a top shell and a bottom shell, wherein the top shell and the bottom shell are snapped together, and the top shell and the bottom shell form a receiving space, wherein the hardware encryption housing further comprises a circuit board mounted on the top shell and a trigger switch configured to transmit a trigger signal when the top shell is separated from the bottom shell, a security chip is mounted on the circuit board, and the security chip is provided with a storage module configured to store key information; and the security chip is further provided with a detection module configured to clear the key information in the storage module and lock the security chip when the trigger signal is detected.

Further, the trigger switch comprises a trigger gold finger provided on the circuit board and a contact column connected with the trigger gold finger.

Further, the detection module comprises an internal sensor configured to detect the trigger signal transmitted by the trigger switch and an external sensor configured to detect the trigger signal transmitted by the trigger switch.

Further, the security chip is further provided with a temperature monitoring module configured to clear key information in the storage module and lock the security chip when the detected temperature exceeds a set value.

Further, the security chip is further provided with a power frequency monitoring module configured to clear key information in the storage module and lock the security chip when the detected frequency exceeds a set value.

Further, the security chip is further provided with a voltage monitoring module configured to clear key information in the storage module and lock the security chip when the detected voltage exceeds a set value.

Further, a display screen is further mounted on the top shell, and the display screen is provided with an FPC, wherein the FPC is connected to the circuit board.

Further, the length of the FPC is equal to the length of the connection between the display screen and the circuit board, and the ratio of the width of the FPC to the length of the side of the display screen at which the FPC is located is in a range from ½ to 1.

Further, a first gold finger is provided on the FPC, a second gold finger is provided on the circuit board, and the hardware encryption housing further comprises a connecting member configured to be pressed against the first gold finger and the second gold finger respectively to electrically connect the first gold finger with the second gold finger.

According to the present application, a security chip is provided on the circuit board, and the security chip is provided with a storage module configured to store a key to ensure the security of the payment transaction; a trigger switch is provided to transmit a trigger signal when the top shell is separated from the bottom shell, and the detection module is provided in the security chip to detect whether the trigger switch transmits a trigger signal. When the trigger signal is detected, the key information in the storage module is cleared to prevent leakage of user information. The security chip is locked at the same time so as to lock the payment device using the hardware encryption housing, so that it is unable to continue to operate, thereby improving security.

Another object of the present application is to provide a payment device, comprising the hardware encryption housing as described above.

The payment device of the present application uses the above-mentioned hardware encryption housing, and may clear the key signal when the top shell is separated from the bottom shell to prevent leakage of user information. At the same time, the payment device may be locked to prevent the payment device from continuing to perform payment transactions, prevent credit card fraud, and improve security.

DESCRIPTION OF THE EMBODIMENTS

Figure 1:
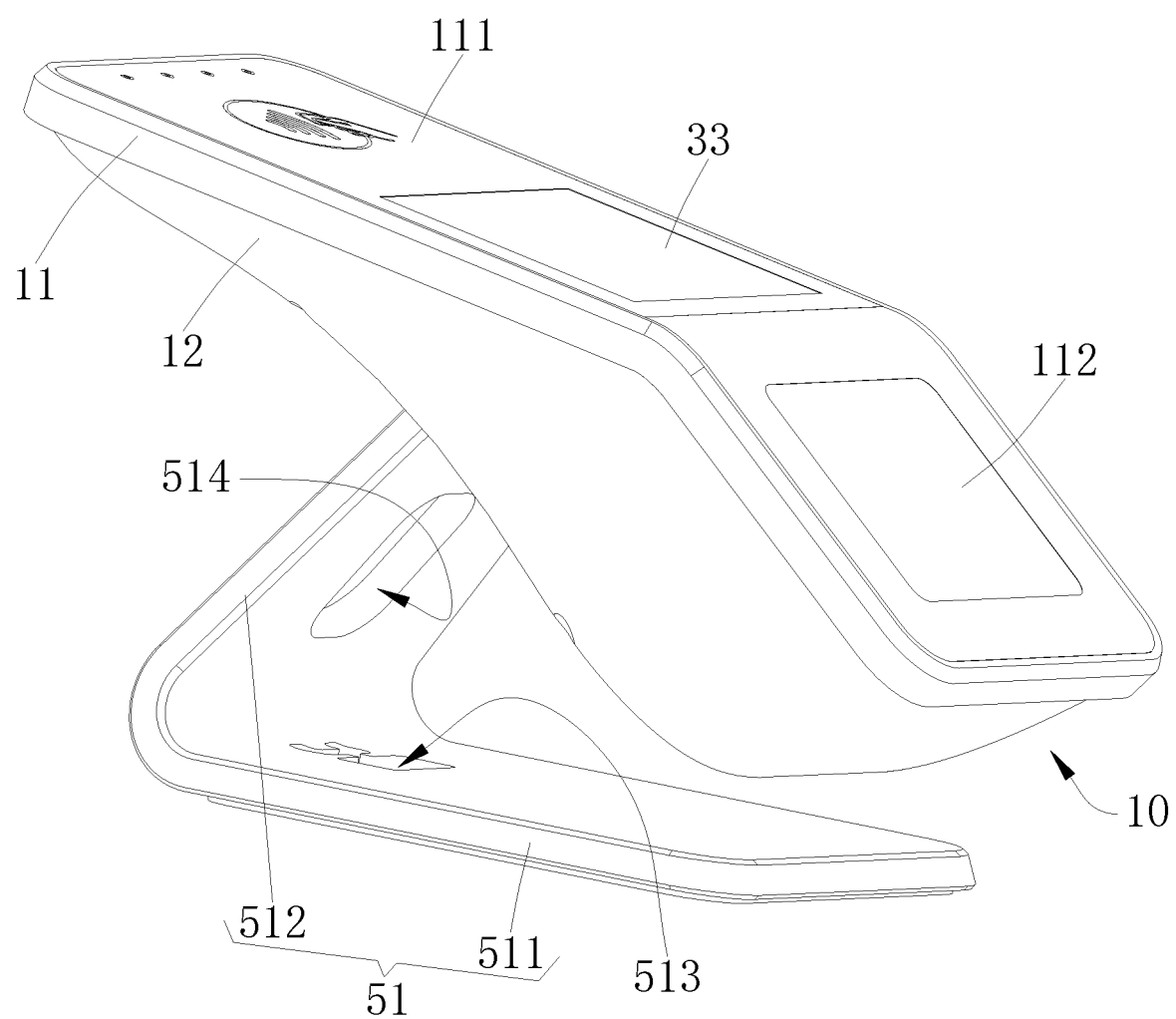
FIG. 1 is a perspective structural schematic view of a payment device provided by one embodiment of the present application.

In order to make the objectives, technical solutions and advantages of the present application clearer, the present application will be further described in detail with reference to the accompanying drawings and embodiments. It should be understood that the specific embodiments described herein are only used to explain the present application, and are not intended to limit the present application.

It should be noted that when an element is referred to as being "fixed on" or "provided on" another element, the element may be directly located on the other element or there may be an intermediate element at the same time. When an element is referred to as being "connected to" another element, the element may be directly connected to the other element or there may be an intermediate element at the same time.

It should also be noted that in the description of the present application, it should be noted that the orientation or positional relationship of the terms such as "middle", "upper", "lower", "horizontal", "bottom", "inner" and "outer" is based on the orientation or positional relationship shown in the accompanying drawings merely for the convenience of describing the present application and a simplified description rather than indicating or implying that the indicated device or element must have a particular orientation, be constructed and operate in a particular orientation. Therefore it cannot be understood as a limitation of the present application.

In the present application, Chinese translation corresponding to each English word is as follows: FPC (Flexible Printed Circuit, referred to as FPC for short).

Referring to FIGS. 1-8, a payment device 100 according to an embodiment of the present application comprises a hardware encryption housing 10. The hardware encryption housing 10 comprises a top shell 11 and a bottom shell 12. The top shell 11 and the bottom shell 12 are snapped together. The top shell 11 is fixed on the bottom shell 12 so that the top shell 11 and the bottom shell 12 form a receiving space configured to mount various electronic components. The hardware encryption housing 10 further comprises a circuit board 21 and a trigger switch. The circuit board 21 is mounted on the top shell 11. The circuit board 21 is supported by the top shell 11. The trigger switch is configured to transmit a trigger signal when the top shell 11 and the bottom shell 12 are separated. The trigger switch may be provided at the connection between the top shell 11 and the bottom shell 12. For example, the trigger switch may be provided at the connecting screw connecting the top shell 11 and the bottom shell 12. Once the screw is loosened, the trigger switch is touched so that the trigger switch transmits a trigger signal. The circuit board 21 is provided with a security chip 22, and the security chip 22 is provided with a storage module configured to store key information to ensure the security of the payment transaction; the security chip 22 is further provided with a detection module to detect whether the trigger switch transmits a trigger signal. After the trigger signal is detected, the key information in the storage module is cleared, and the security chip 22 is locked at the same time. The payment device 100 using the hardware encryption housing 10 will be thus locked so as to prevent the payment device 100 from performing payment operations, prevent user information from being stolen, and thereby improve security.

The security chip 22 is provided on the circuit board 21, and the storage module is provided in the security chip 22 to store the key so as to ensure the security of the payment transaction; a trigger switch is provided so as to transmit a trigger signal when the top shell 11 is separated from the bottom shell 12. A detection module is provided in the security chip 22 to detect whether the trigger switch transmits a trigger signal. When the trigger signal is detected, the key information in the storage module is cleared to prevent leakage of user information. The security chip 22 is locked at the same time to lock the payment device 100 using the hardware encryption housing 10 so as not to continue to operate to improve security. Of course, in other embodiments, an external memory may also be provided to store the key or other information.

The payment device 100 uses the above-mentioned hardware encryption housing 10 and may clear the key signal when the top shell 11 is separated from the bottom shell 12 to prevent leakage of user information. At the same time, the payment device 100 may be locked to prevent the payment device 100 from continuing to perform payment transactions, prevent credit card fraud, and thereby improve security.

Figures 2, 3:
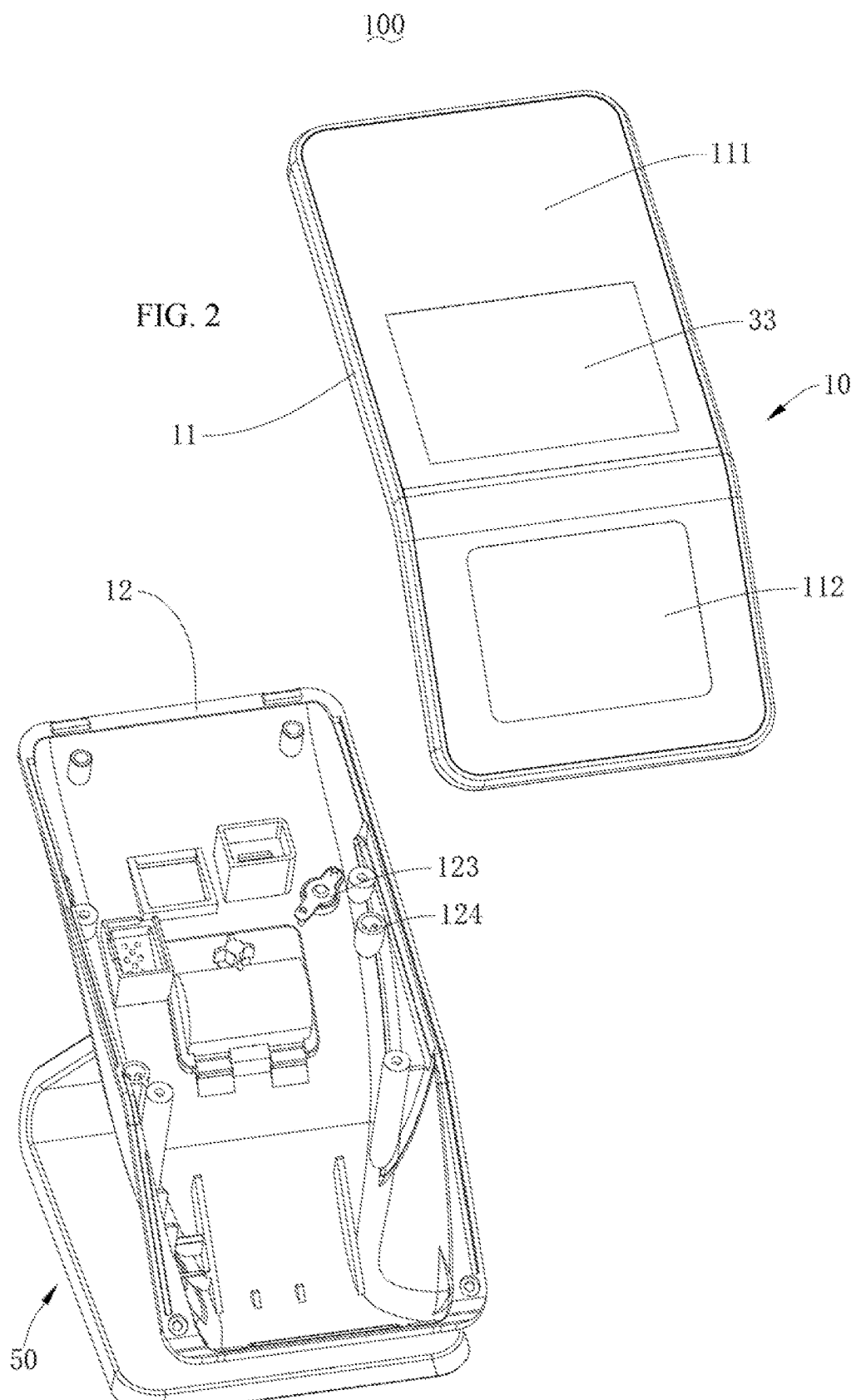
FIG. 2 is a perspective structural schematic view of a payment device in FIG. 1 viewed from another angle.
FIG. 3 is an exploded structural schematic view of a payment device in FIG. 1.
Figure 5:
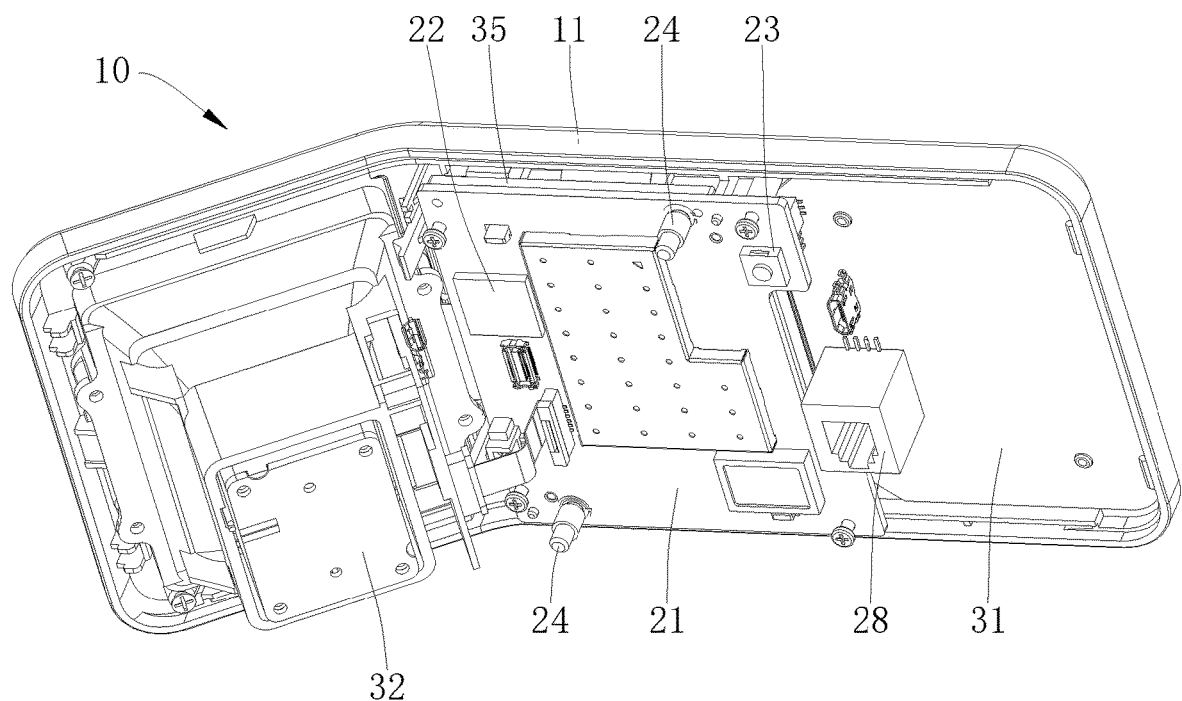
FIG. 5 is a partial structural schematic view of a hardware encryption housing in FIG. 3.
Figure 6:
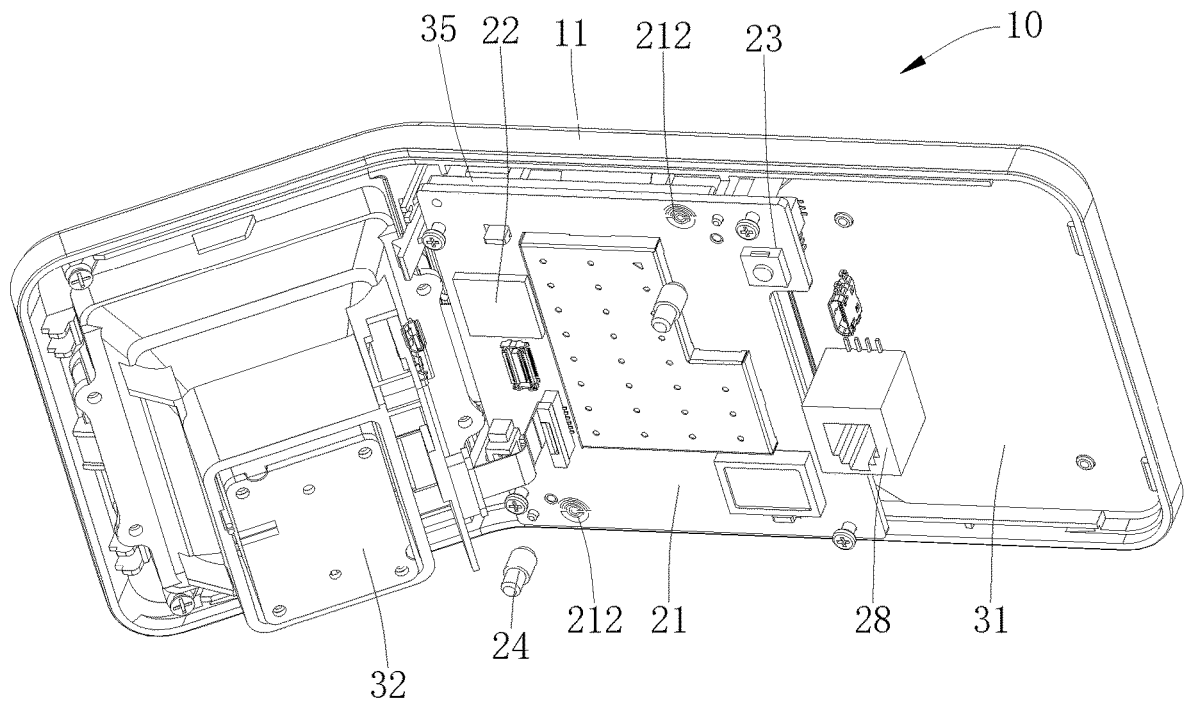
FIG. 6 is a structural schematic view of the hardware encryption housing in FIG. 5, wherein a connecting column and a circuit board are separated.
Figure 7:
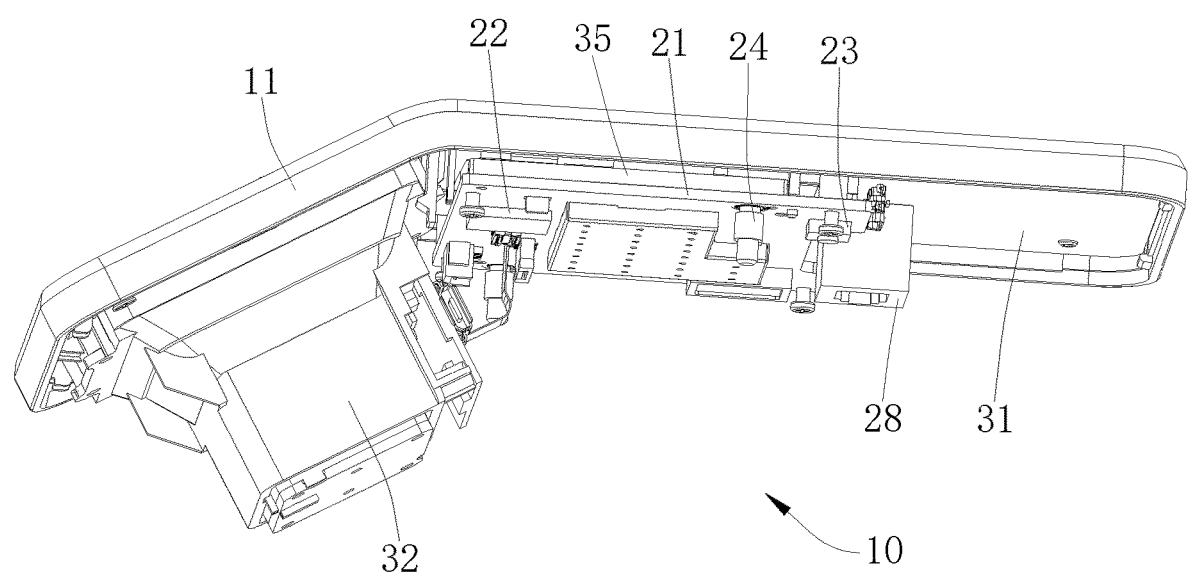
FIG. 7 is a perspective structural schematic view of the hardware encryption housing in FIG. 5 viewed from another angle.

Further, referring to FIG. 3 and FIG. 5, a reset switch 23 is mounted on the circuit board 21, and a button 123 configured to push against the reset switch 23 is mounted on the bottom shell 12 to facilitate the reset operation.

Further, the trigger switch comprises a trigger gold finger 212 provided on the circuit board 21 and a contact column 24 connected to the trigger gold finger 212. When the bottom shell 12 is separated from the top shell 11, the contact column 24 will be separated from the trigger gold finger 212 on the circuit board 21 to transmit a trigger signal. When the security chip 22 detects the trigger signal, key information in the storage module will be cleared, and the security chip 22 is locked at the same time.

Further, a mounting column configured to mount the contact column 24 in a cooperating manner is provided in the bottom shell 12 so as to support the contact column 24. In this embodiment, there are two contact columns 24, which are located at both sides of the circuit board 21, respectively. Two corresponding trigger fingers 212 are correspondingly provided at both sides of the circuit board 21, respectively.

Further, the detection module in the security chip 22 comprises an internal sensor configured to detect the trigger signal transmitted by the trigger switch and an external sensor configured to detect the trigger signal transmitted by the trigger switch. The external sensor and the internal sensor are used. When the external sensor or the internal sensor detects a trigger signal, a security mechanism will be started. That is to say, the key information in the storage module is cleared and the security chip 22 is locked.

Further, the security chip 22 is further provided with a temperature monitoring module configured to clear key information in the storage module and locking the security chip 22 when the detected temperature exceeds a set value. The temperature monitoring module is provided to clear the key information in the storage module and lock the security chip 22 when the temperature of the payment device 100 exceeds a set security value so as to prevent the external high temperature from damaging the housing and stealing the user information and the transaction data.

Further, the security chip 22 is further provided with a power frequency monitoring module configured to clear key information in the storage module and locking the security chip 22 when the detected frequency exceeds a set value. The power frequency monitoring module is provided to clear the key information in the storage module and lock the security chip 22 when the power frequency of the payment device 100 exceeds a set security value so as to prevent external electronic devices from directly cracking or destroying the security chip 22 and stealing the user information and the transaction data.

Further, two metal meshes are provided in the security chip 22. Two metal meshes are provided in the security chip 22, which can better protect the security chip 22 and improve the security of the security chip 22.

Further, the security chip 22 is further provided with a voltage monitoring module configured to clear key information in the storage module and locking the security chip 22 when the detected voltage exceeds a set value. The voltage monitoring module is provided to clear the key information in the storage module and lock the security chip 22 when the working voltage of the payment device 100 exceeds a set security value so as to prevent external electronic devices from directly cracking or destroying the security chip 22 and stealing the user information and the transaction data.

Particularly, in this embodiment, the security chip 22 is a security CPU from Broadcom (CPU with a model number of BCM58303). In other embodiments, the security chip 22 may also be a security CPU from other companies.

Figure 8:
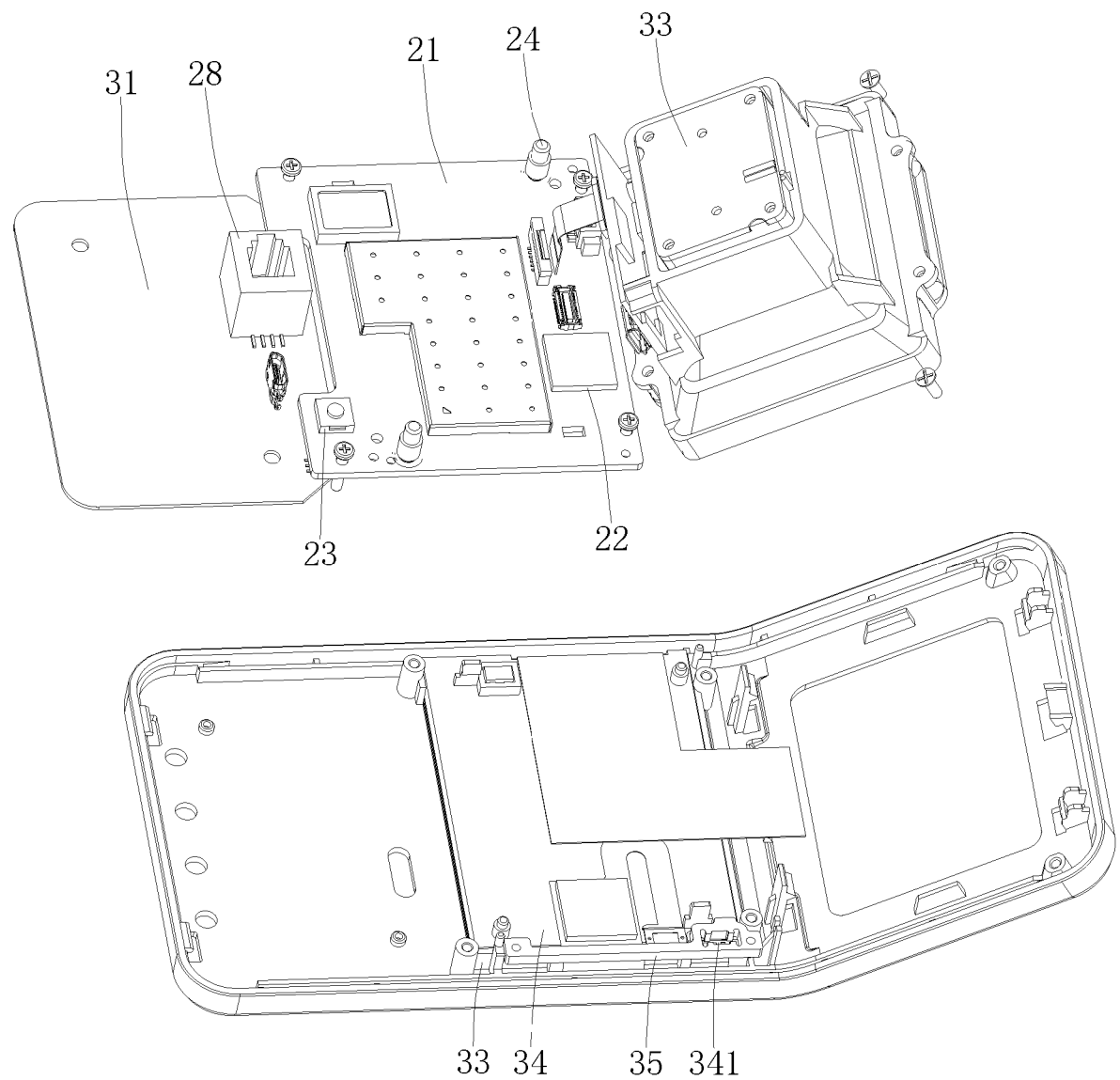
FIG. 8 is a structural schematic view of the hardware encryption housing in FIG. 5, wherein the top shell and the circuit board are separated.

Refer to FIG. 8 together. Further, a display screen 33 is further mounted on the top shell 11, the display screen 33 is provided with an FPC 34, and the FPC 34 is connected to the circuit board 21. The display screen 33 is provided so as to display the content of payment and thereby further facilitate customers' use. Further, the display screen 33 is a touch screen, facilitating inputting operations through the display screen 33, and facilitating online payment at the same time. Particularly, online payment comprises: applications APPS, browsers, APP calls for various network payments (application calls for various payments), etc.

Further, the display screen 33 may also display a two-dimensional code map, so that customers can use a smart device such as a mobile phone and a tablet to perform online code scanning payment.

Further, the length of the FPC 34 is equal to the length of the connection from the display screen 33 to the circuit board 21, and the ratio of the width of the FPC 34 to the length of the side where the FPC 34 on the display screen 33 is located is in a range from 1/2 to 1. The length of the EPC 34 is set to be equal to the length of the connection between the display screen 33 and the circuit board 21, which may increase the difficulty of disassembling the FPC 34; and the ratio between the width of the FPC 34 and the length of the corresponding side of the display screen 33 is set to be in a range from 1/2 to 1. That is to say, the width of the FPC 34 is from half of the length of the corresponding side of the display screen 33 to the extent that the entire corresponding side of the display screen 33 is provided with the FPC 34. Compared with the prior art, this structure increases the width of the FPC 34 so as to be torn off when the FPC 34 is opened to protect the display screen 33 and prevent credit card fraud due to the change of the consumption information through the display screen 33. In this embodiment, the length of the FPC 34 is slightly smaller than the length of the display screen 33, and the FPC 34 is attached to the back of the display screen 33. The display screen 33 may be protected by the FPC 34 to improve the security.

Further, a first gold finger 341 is provided on the FPC 34, a second gold finger (not shown) is provided on the circuit board 21, and the hardware encryption housing 10 further comprises a connecting member configured to be pressed against the first gold finger 341 and the second gold finger to electrically connect the first gold finger 341 and the second gold finger. The first gold finger 341 and the second gold finger are pressed by the connecting member to electrically connect the first gold finger 341 with the second gold finger. The FPC 34 is protected by the connecting member. When the connecting member is loosened, or the top shell 11 is loosened, or the display screen 33 is opened, the connecting member will be loosened, and a trigger signal will be transmitted to play the role of security protection and prevent the FPC 34 from being opened or damaged. In this embodiment, the connecting member is a zebra strip. In other embodiments, the connecting member may also be a support or a cylindrical silicone, etc.

Further, a conductive mesh (not shown) is provided on the FPC 34, and the conductive mesh is connected with the circuit board 21. The conductive mesh (mesh in English) is provided. When the FPC 34 is opened or damaged, the conductive mesh will be damaged first to transmit a trigger signal to trigger a security mechanism. Further, a conductive mesh is provided inside the FPC 34 to improve security.

Further, a near field payment area 111 and a code scanning payment area 112 are provided on the top shell 11, the payment device 100 further comprises a near field payment module 31 and a code scanning payment module 32, the near field payment module 31 and the code scanning payment module 32 are mounted in the hardware encryption housing 10, and a circuit board 21 is electrically connected with the near field payment module 31 and the code scanning payment module 32 to control the operation of the near field payment module 31 and the code scanning payment module 32. The near field payment module 31 is located at a position corresponding to the near field payment area 111, and the code scanning payment module 32 is located at a position corresponding to the code scanning payment area 112, so that in a process of code scanning payment, the code scanning payment may be performed only by aligning a two-dimensional code on an electronic device such as a mobile phone or a tablet with the code scanning payment area 112 on the hardware encryption housing 10; whereas in the process of near field payment, the near field payment may be performed only by bringing a near field payment device 100 close to the near field payment area 111.

By providing the near field payment area 111 and the code scanning payment area 112, mounting the near field payment module 31 and the code scanning payment module 32 in the hardware encryption housing 10, providing the near field payment module 31 at a position corresponding to the near field payment area 111, and providing the code scanning payment module 32 at the code scanning payment area 112, the payment device 100 may perform both near field payment and code scanning payment; in transactions, merchants only need to prepare a device, which may reduce occupancy space and reduce the cost of purchasing devices. In addition, compared with the existing magnetic stripe card and IC card-based payment methods and payment devices 100, the payment device 100 may better protect near field payment cards and devices, protect code scanning payment devices, prevent cards from being worn, and prevent the risk that criminals copy magnetic stripe cards.

Particularly, near field payment comprises the following categories:

Card payment: Quick Pass, VISA (Visa), MasterCard and other NFC cards (NFC cards: Near Field Communication, supporting near field wireless communication cards).

Card token payment: China Unionpay Quick Pass, Apple pay, Huawei pay, Samsung Pay, and Xiaomi Pay.

Code scanning payment comprises: WeChat code scanning payment, Alipay code scanning payment, and Unionpay code scanning payment.

Further, the plane where the display screen 33 is located is in the same plane as the front surface of the near field payment area 111. This structure may facilitate the manufacture of the hardware encryption housing 10, and facilitate the near field payment operation while viewing the display screen 33.

Particularly, in the process of code scanning payment, there may be a cardholder scanning mode: a dynamic two-dimensional code may be displayed through the display screen 33 to facilitate scanning. Further, a two-dimensional code may be set to be updated once every one minute, so the security is better. In addition, the dynamic two-dimensional code may be acquired through networking with the background or generated by the whole machine, so as to ensure that the displayed two-dimensional code is safe. There may also be a cardholder scanned mode: the code scanning payment module 32 is used to actively scan a UnionPay two-dimensional code for payment. In the UnionPay two-dimensional code payment method, merchants may only obtain encrypted payment information, but cannot obtain other information about the bank card, which is safer. The amount of consumption is transmitted to the payment device 100 by an upper computer, such as an Electronic Cash Register (ECR), and the amount is displayed on the screen. The consumer only needs to place the payment code close to the device and the device performs scanning for payment. Moreover, the device is better in performance, and is relatively low in performance requirement of a mobile phone of consumers.

Further, a Bluetooth module (not shown in the figure) is further mounted on the circuit board 21 so as to integrate the Bluetooth function and thereby be further used as a BT Beacon to attract consumers to customers; at the same time, the display screen 33 may play a video advertisement, display a two-dimensional code of merchants, and promote advertising coupons of merchants, etc.

Further, an included angle between a front surface of the code scanning payment area 112 and a horizontal plane is greater than an included angle between a front surface of the near field payment area 111 and a horizontal plane. The included angle between a front surface of the code scanning payment area 112 and a horizontal plane is set to be larger so that the code scanning payment area 112 tends to be in the vertical position more easily. Since users usually hold the upper or lower position of a handheld card or a smart phone when performing the near field payment, they are accustomed to placing the card or the smart phone slightly obliquely to the horizontal direction; in the process of code scanning, the two sides of a smart phone or a tablet are usually held by hand so as to expose the screen, and thus the smart phone will tend to be in the vertical position. Therefore, in this embodiment, the included angle between a front surface of the code scanning payment area 112 and a horizontal plane is set to be larger, which is convenient for users to perform code scanning payment and near field payment.

Further, the range of the included angle between the front surface of the code scanning payment area 112 and a horizontal plane is 40-50 degrees. The structure enables the inclination by which users scan the code and the desktop to form an angle of 40-50 degrees so as to facilitate the scanning code operation for cardholders of different heights. The reason why different angles are designed is as follows: better facilitating the use for people of different heights and providing a better man-machine operation experience. For example, the angle of 50 degrees is more suitable for short people, and the inclination of 40 degrees is more suitable for tall people. The range of the included angle between the front surface of the code scanning payment area 112 and a horizontal plane is set to be 40-50 degrees so as to be suitable for most users.

Further, the near field payment area 111 and the code scanning payment area 112 are arranged longitudinally. Particularly, in the front-to-back longitudinal arrangement, the near field payment area 111 and the code scanning payment area 112 may be sequentially arranged. Of course, the payment code area 112 and the near field payment area 111 may be sequentially provided. In other embodiments, the near field payment area 111 and the code scanning payment area 112 are arranged side by side horizontally. Particularly, in the left-to-right horizontal arrangement, the near field payment area 111 and the code scanning payment area 112 may be sequentially arranged. Of course, the payment code area 112 and the near field payment area 111 may be sequentially arranged.

In this embodiment, since the payment device 100 further comprises a display screen 33, the display screen 33, the near field payment area 111, and the code scanning payment area 112 are arranged longitudinally. For example, in this embodiment, in the front-to-back longitudinal arrangement, a code scanning payment area 112, a display screen 33 and a near field payment area 111 may be sequentially arranged. In other embodiments, in the front-to-back longitudinal arrangement, the near field payment area 111, the display screen 33 and the code scanning payment area 112 may also be sequentially arranged. There may also be sequentially: a display screen 33, a code scanning payment area 112 and a near field payment area 111; a display screen 33, a near field payment area 111, and a code scanning payment area 112; a code scanning payment area 112, a near field payment area 111 and a display screen 33; a near field payment area 111, a code scanning payment area 112 and a display screen 33. Of course, in some embodiments, the display screen 33, the near field payment area 111, and the code scanning payment area 112 may also be arranged horizontally. For example, in the left-to-right horizontal arrangement, the code scanning payment area 112, the display screen 33 and the near field payment area 111 may be sequentially arranged. In other embodiments, in the left-to-right horizontal arrangement, the near field payment area 111, the display screen 33 and the code scanning payment area 112 may also be sequentially arranged. There may also be sequentially: a display screen 33, a code scanning payment area 112 and a near field payment area 111; a display screen 33, a near field payment area 111 and a code scanning payment area 112; a code scanning payment area 112, a near field payment area 111 and a display screen 33; and a near field payment area 111, a code scanning payment area 112, and a display screen 33.

Further, a connection interface 28 configured to connect an external server is provided at the bottom shell 12, and the connection interface 28 is electrically connected with the circuit board 21. A connection interface 28 is provided at the bottom of the hardware encryption housing 10 for facilitating the connection with an external server. For example, when the connection interface 28 is a network interface, it may be directly networked with an external server; when the connection interface 28 is a data interface, it may realize direct data connection with an external server. In still other embodiments, a wireless module such as a WiFi may be mounted in the hardware encryption housing 10 so as to be connected with an external server through a wireless connection.

Figure 4:
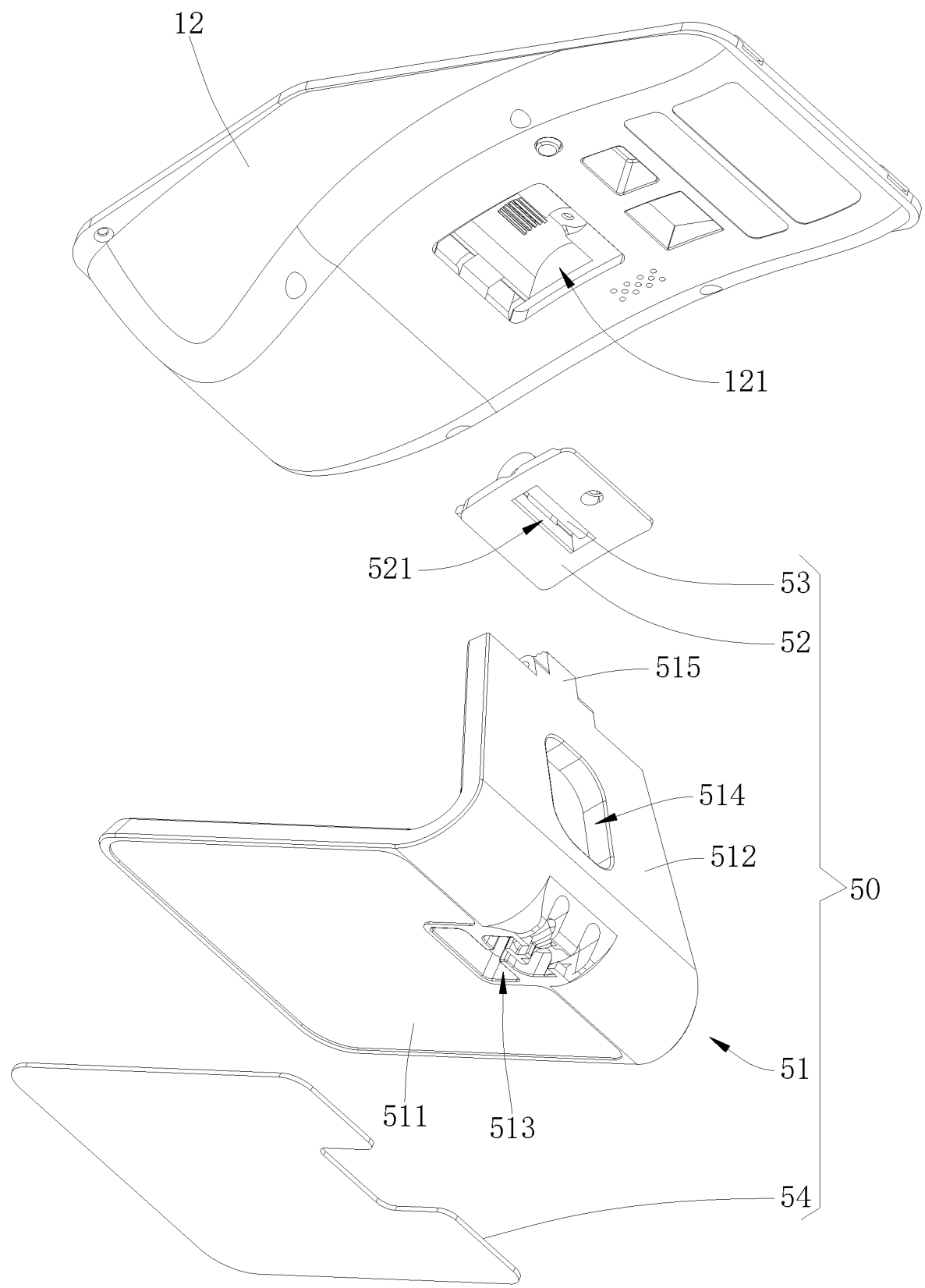
FIG. 4 is an exploded structural schematic view of a bottom shell and a base in FIG. 3.

Referring to FIGS. 2, 3 and 4, further, the payment device 100 further comprises a base 50, the base 50 is pivotally connected to the bottom shell 12 so as to support the payment device 100 through the base 50 and facilitate the adjustment of an angle between the hardware encryption housing 10 and a horizontal direction at the same time.

Further, the base 50 comprises a support 51, the support 51 comprises a base plate 511 and a support plate 512 provided obliquely to the base plate 511, a lower end of the support plate 512 is connected to the base plate 511, and an upper end of the support plate 512 is connected to the bottom shell 12. The support plate 512 is connected with the base plate 511 to form the support 51, which has the advantages of a simple structure, a convenient processing, a low cost, and a light weight, and is connected with the bottom shell 12 at the same time so as to stably support the hardware encryption housing 10.

Particularly, the base plate 511 and the support plate 512 may be integrally formed to ensure the connection strength between the base plate 511 and the support plate 512. In other embodiments, the support plate 512 may also be fixed on the base plate 511.

Further, the base 50 further comprises a gasket 54 fitted to the bottom surface of the base plate 511. The gasket 54 is provided to increase the friction between the base plate 511 and the media surface such as the desktop so that the base 50 may be more stably supported on the desktop. Meanwhile, the base plate 511 may be reduced in wear.

Further, the support plate 512 is connected to one end of the base plate 511, a clamping hole 513 configured to clamp a conducting wire is provided in the middle of the connection between the support plate 512 and the base plate 511, and the middle of the support plate 512 is provided with an opening through which the conducting wire passes. A clamping hole 513 is defined in the support 51, and an opening 514 is defined in the middle of the support plate 512, so that the conducting wire is fixed through the clamping hole 513 so as to fix the conducting wire through which the payment device 100 is connected with an external server or charged. An opening 514 is defined in the support plate 512 so that the conducting wire may be better arranged so as to ensure the cleanness of the tabletop.

Further, the base 50 further comprises a connecting block 52, a receiving groove 121 for receiving the connecting block 52 in a cooperating manner is defined at the bottom shell 12, a convex plate 515 is provided at the top of the support plate 512, a socket 521 into which the convex plate 515 is inserted is defined at the bottom of the connecting block 52, and a connecting shaft 53 which passes through the convex plate 515 and is fixed in the socket 521 is mounted on the connecting block 52. By using the connecting block 52 and connecting the convex plate 515 on the support plate 512 with the connecting block 52 through the connecting shaft 53, the angle between the connecting block 52 and the support plate 512 may be slightly adjusted so as to adjust the horizontal angle of the hardware encryption housing 10. A receiving groove 121 is provided at the bottom shell 12 so as to facilitate the mounting of the connecting block 52. The connecting block 52 is provided, which also facilitates the connection between the bottom shell 12 and the support plate 512. In other embodiments, the support plate 512 may also be directly connected with the bottom shell 12.

The above description is only the preferred embodiment of the present application, and not intended to limit the present application. Any modification, equivalent replacement and improvement made within the spirit and principle of the present application should be included within the scope of protection of the present application.

What is claimed is:

1. A hardware encryption housing, comprising a top shell and a bottom shell, wherein the top shell and the bottom shell are snapped together, and the top shell and the bottom shell form receiving space, wherein the hardware encryption housing further comprises a circuit board mounted on the top shell and a trigger switch configured to transmit a trigger signal when the top shell is separated from the bottom shell, a security chip is mounted on the circuit board, wherein the security chip is provided with a storage module configured to store key information; and the security chip is further provided with a detection module configured to clear the key information in the storage module and lock the security chip when the trigger signal is detected;

wherein a display screen is further mounted on the top shell, and the display screen is provided with a flexible printed circuit (FPC), wherein the flexible printed circuit (FPC) is connected to the circuit board;

wherein the length of the flexible printed circuit (FPC) is equal to the length of the connection between the display screen and the circuit board, and the ratio of the width of the flexible printed circuit (FPC) to the length of the side of the display screen at which the flexible printed circuit (FPC) is located is in a range from ½ to 1.

2. The hardware encryption housing according to claim 1, wherein the trigger switch comprises a trigger gold finger provided on the circuit board and a contact column connected with the trigger gold finger.

3. The hardware encryption housing according to claim 1, wherein the detection module comprises an internal sensor configured to detect the trigger signal transmitted by the trigger switch and an external sensor configured to detect the trigger signal transmitted by the trigger switch.

4. The hardware encryption housing according to claim 1, wherein the security chip is further provided with a temperature monitoring module configured to clear key information in the storage module and lock the security chip when the detected temperature exceeds a set value.

5. The hardware encryption housing according to claim 1, wherein the security chip is further provided with a power frequency monitoring module configured to clear key information in the storage module and lock the security chip when the detected frequency exceeds a set value.

6. The hardware encryption housing according to claim 1, wherein the security chip is further provided with a voltage monitoring module configured to clear key information in the storage module and lock the security chip when the detected voltage exceeds a set value.

7. The hardware encryption housing according to claim 1, wherein a first gold finger is provided on the flexible printed circuit (FPC), a second gold finger is provided on the circuit board, and the hardware encryption housing further comprises a connecting member configured to be pressed against the first gold finger and the second gold finger to respectively electrically connect the first gold finger with the second gold finger.

8. A payment device, comprising the hardware encryption housing according to claim 1.

9. The hardware encryption housing according to claim 1, wherein a conductive mesh is further provided on the flexible printed circuit (FPC), and the conductive mesh is connected with the circuit board.

10. The payment device according to claim 8, wherein the payment device further comprises a base, the base is pivotally connected to the bottom shell so as to support the payment device.

11. The payment device according to claim 10, wherein the base comprises a support, the support comprises a base plate and a support plate provided obliquely to the base plate, a lower end of the support plate is connected to the base plate, and an upper end of the support plate is connected to the bottom shell.

12. The payment device according to claim 11, wherein the base further comprises a gasket fitted to the bottom surface of the base plate.

13. The payment device according to claim 11, wherein the support plate is connected to one end of the base plate, a clamping hole configured to clamp a conducting wire is provided in the middle of the connection between the support plate and the base plate, and the middle of the support plate is provided with an opening through which the conducting wire passes.

14. The payment device according to claim 11, wherein the base further comprises a connecting block, a receiving groove for receiving the connecting block in a cooperating manner is defined at the bottom shell, a convex plate is provided at the top of the support plate, a socket into which the convex plate is inserted is defined at the bottom of the connecting block, and a connecting shaft which passes through the convex plate and is fixed in the socket is mounted on the connecting block.

\* \* \* \* \*